US012686595B2

(12) United States Patent
Torii et al.

(10) Patent No.: US 12,686,595 B2
(45) Date of Patent: Jul. 21, 2026

(54) ELEVATOR DEVICE

(71) Applicant: Hitachi, Ltd., Tokyo (JP)

(72) Inventors: Ryoutarou Torii, Tokyo (JP); Atushi Daikokuya, Tokyo (JP); So Fukasawa, Tokyo (JP); Noriyuki Katou, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 18/865,736

(22) PCT Filed: Jun. 16, 2022

(86) PCT No.: PCT/JP2022/024064

§ 371 (c)(1),
(2) Date: Nov. 14, 2024

(87) PCT Pub. No.: WO2023/243026

PCT Pub. Date: Dec. 21, 2023

(65) Prior Publication Data

US 2025/0340403 A1 Nov. 6, 2025

(51) Int. Cl.
*B66B 5/26* (2006.01)

(52) U.S. Cl.
CPC .................................... *B66B 5/26* (2013.01)

(58) Field of Classification Search
CPC ................................ B66B 5/26; B66B 19/002
See application file for complete search history.

(56) References Cited

U.S. PATENT DOCUMENTS 1,081,312 A * 12/1913 Kalnasi ..................... B66B 5/26 187/365
2,497,245 A * 2/1950 Vance ....................... B66B 5/26 187/378
4,431,087 A * 2/1984 Karol ........................ B66B 7/02 238/337

(Continued)

FOREIGN PATENT DOCUMENTS

CN 206798882 U 12/2017
CN 110642114 A 1/2020

(Continued)

OTHER PUBLICATIONS

International Search Report of PCT/JP2022/024064 dated Jul. 19, 2022.

*Primary Examiner* — Michael A Riegelman
(74) *Attorney, Agent, or Firm* — MATTINGLY & MALUR, PC

(57) ABSTRACT

An object of the present invention is to provide an elevator device that can suppress slippage caused between a rail clip and a fixing member by a rotation moment acting on the fixing member in an elevator car fixing device. The elevator car fixing device of the present invention includes a fixing member 22 provided with a through hole 221 through which a stopper pin is to be inserted, a first holding member (rail clip) 23 that holds the fixing member 22 from a car guide rail 106 side, and a second holding member (rotation restraining member) 21A, 21B that holds the fixing member 22 from a side opposite to the first holding member 23 side. In addition, the second holding member 21A, 21B has an abutting portion 211 that abuts on a side surface 106*e*, 106*f* of the car guide rail 106.

6 Claims, 11 Drawing Sheets

(56) References Cited

U.S. PATENT DOCUMENTS

| | | | | | |
|---|---|---|---|---|---|
| 4,577,729 | A * | 3/1986 | Karol | B66B 7/02 | 187/408 |
| 5,520,264 | A * | 5/1996 | Korhonen | B66B 7/024 | 187/408 |
| 6,012,554 | A * | 1/2000 | Ito | B66B 7/022 | 187/406 |
| 10,252,886 | B2 * | 4/2019 | Fernandez | B66B 7/026 | |
| 2012/0133164 | A1 * | 5/2012 | Sanz Gamboa | B66B 7/024 | 294/119.1 |
| 2012/0312640 | A1 * | 12/2012 | Bjorni | B66B 7/023 | 187/408 |
| 2015/0128403 | A1 * | 5/2015 | Valkama | B66B 19/002 | 29/281.6 |
| 2017/0008733 | A1 * | 1/2017 | Fernandez | B66B 7/026 | |
| 2018/0370766 | A1 * | 12/2018 | Madureira De Almeida | B66B 7/024 | |
| 2020/0062547 | A1 * | 2/2020 | Simonatto Marques | B66B 7/024 | |
| 2022/0024722 | A1 * | 1/2022 | Hosemann | B66B 7/024 | |

FOREIGN PATENT DOCUMENTS

| | | | | |
|---|---|---|---|---|
| JP | H09124251 | | * | 5/1997 |
| JP | 2000-203774 | A | | 7/2000 |
| JP | 2007246212 | A | * | 9/2007 |
| JP | 2016098106 | A | * | 5/2016 |

* cited by examiner

ELEVATOR DEVICE

TECHNICAL FIELD

The present invention relates to an elevator device including an elevator car fixing device that fixes an elevator car at a height position where maintenance and inspection work is to be performed.

BACKGROUND ART

Patent Literature 1 describes an elevator car stop locking device that operates a locking rod of an operation mechanism provided in an upper portion of an elevator car to insert the locking rod into a locking rod insertion hole of a fixing mechanism provided in a guide rail and thereby fixes the elevator car (see Abstract). In this stop locking device, the fixing mechanism is fixed to a rail clip for attaching the guide rail to a stationary portion such as a wall of a hoistway (see Paragraph 0034 and FIGS. 3 and 5).

CITATION LIST

Patent Literature

Patent Literature 1: Japanese Unexamined Patent Application Publication No. 2000-203774

SUMMARY OF INVENTION

Technical Problem

The fixing mechanism is a plate-like member which has one end portion side in a horizontal direction supported by the guide rail with a rail clip and another end portion side in the horizontal direction protruding in a cantilever shape toward a support portion by the guide rail, and the protruding portion is provided with the locking rod insertion hole. Accordingly, the fixing mechanism receives a rotation moment due to a load of the elevator car. The rail clip receives the rotation moment acting on the fixing mechanism with a frictional holding force acting on a portion in contact with the fixing mechanism. The frictional holding force of the rail clip is limited and, when a magnitude of the rotation moment acting on the fixing mechanism exceeds the frictional holding force due to the rail clip, slippage occurs between the rail clip and the fixing mechanism, and the fixing mechanism can no longer maintain reliability as a fixture that fixes the elevator car.

In a description given below, the elevator car, the locking rod, and the fixing mechanism are respectively referred to as an elevator car, a stopper pin, and a fixing member, while a device that fixes the elevator car at a height position where maintenance work is to be performed is referred to as an elevator car fixing device.

An object of the present invention is to provide an elevator device that can suppress slippage caused between a rail clip and a fixing member by a rotation moment acting on the fixing member in an elevator car fixing device.

Solution to Problem

In order to achieve the above object, an elevator device of the present invention includes, on a car top of an elevator car, an elevator car fixing device that fixes the elevator car to a car guide rail. The elevator car fixing device is configured to include: a fixing portion, the fixing portion having a fixing member provided with a through hole, a first holding member that holds the fixing member from the car guide rail side, and a second holding member that holds the fixing member from a side opposite to the first holding; and a stopper pin operation mechanism portion having a stopper pin to be inserted into the through hole. The second holding member has an abutting portion that abuts on a side surface of the car guide rail.

Advantageous Effects of Invention

According to the present invention, in the elevator car fixing device of the elevator device, the abutting portion of the second holding member abuts on the side surface of the car guide rail to restrain rotation of the fixing member due a rotation moment and suppress slippage occurring between a rail clip and the fixing member. Consequently, the fixing member is securely fixed to the guide rail.

Objects, configurations, and effects other than the above will be apparent from the description of the following embodiments.

DESCRIPTION OF EMBODIMENTS

Referring to FIG. 1 to FIG. 12, a description will be given of illustrative embodiments of an elevator device 100 and an elevator car fixing device 1 of the present invention. In each of the drawings, the same components are denoted by the same reference signs, and a repeated description thereof is omitted. Note that, in the following description, a vertical direction (perpendicular direction) corresponds to a hoisting direction of an elevator car 104, while a horizontal direction is defined as a direction along a width direction of a guide rail 106 to which the elevator car fixing device 1 is to be fixed.

Figure 1:
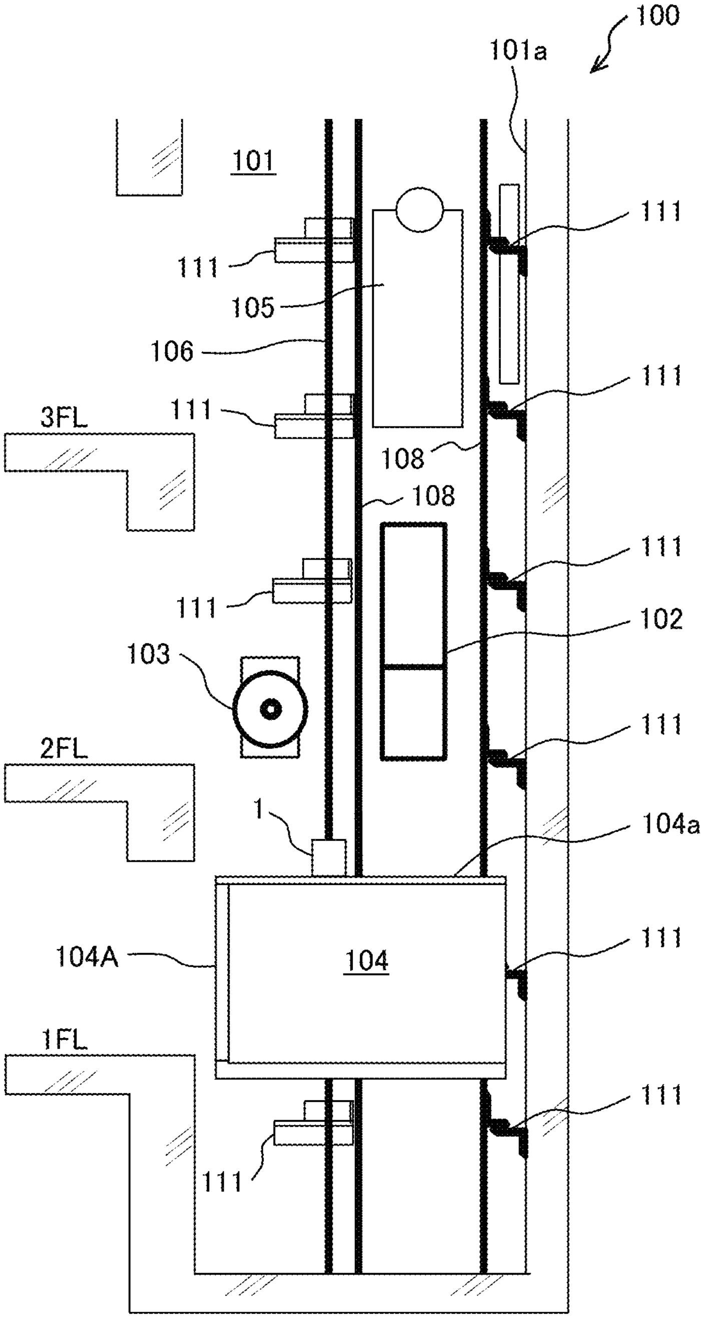
FIG. 1 is a schematic view of an elevator device according to an embodiment of the present invention.

Referring to FIG. 1, a description will be given of a configuration of the elevator device 100. FIG. 1 is a schematic view of the elevator device 100 according to an embodiment of the present invention.

The elevator device 100 includes the elevator car 104, a counterweight 105, a hoist 103, a car guide rail 106, a counterweight guide rail 108, a control device (elevator control device) 102, and an elevator car fixing device 1.

The elevator car 104 and the counterweight 105 are provided inside a hoistway 101 provided in a housing structure and suspended in a well bucket manner by a main rope (not shown) wound around the hoist 103. The elevator car 104 and the counterweight 105 are connected by the main rope.

The main rope not shown is wound around the hoist 103, and the hoist 103 operates the main rope to move the elevator car 104 and the counterweight 105 upward and downward in the hoistway 101.

The car guide rail 106 and the counterweight guide rail 108 are provided to extend in the vertical direction (perpendicular direction) in the hoistway 101 and fixed by rail brackets 111 to a hoistway wall 101*a*. The car guide rail 106 guides the upward and downward movement of the elevator car 104. The counterweight guide rail 108 guides upward and downward movement of the counterweight 105.

The control device 102 controls a hoisting operation of the elevator device 100. Therefore, the control device 102 controls driving of the hoist 103.

The elevator car fixing device 1 is a device for positioning and fixing a car top (upper surface) 104*a* of the elevator car 104 at and to a specified floor where the hoist 103 and the control device 102 are placed when work such as inspection or repair of the hoist 103 and the control device 102 is to be performed, and is provided on the car top 104*a* of the elevator car 104.

Figure 2:
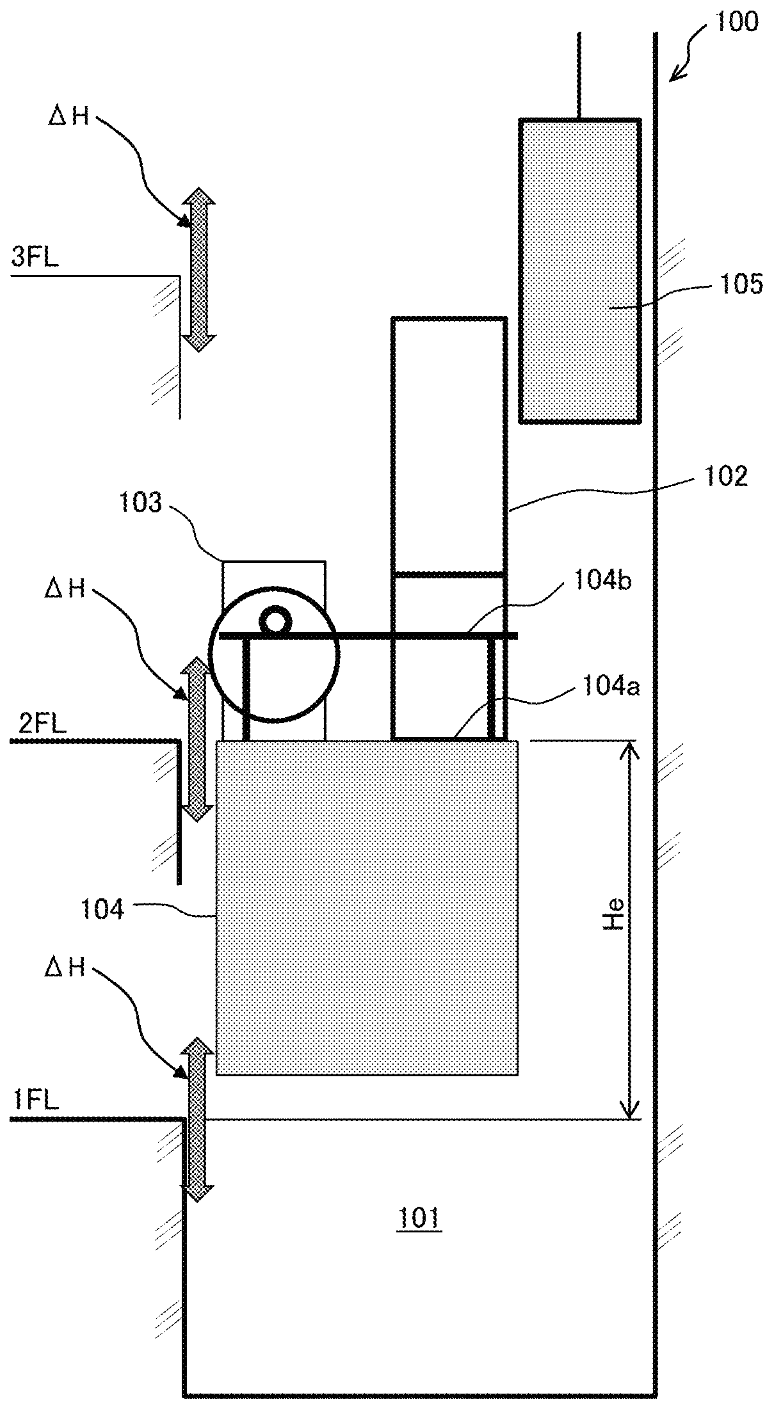
FIG. 2 is a schematic view illustrating a state where, for the elevator device according to the embodiment of the present invention, an elevator car is positioned to and stopped at a predetermined position during maintenance work for a control device.

Referring to FIG. 1 and FIG. 2, a description will be given of automatic adjustment of a car position during maintenance work for the elevator device 100. FIG. 2 is a schematic view illustrating a state where, for the elevator device 100 according to the embodiment of the present invention, the elevator car 104 is stopped and positioned at a predetermined position during maintenance work for the control device 102.

In the elevator device 100 in the present embodiment, the hoist 103 and the control device 102 are placed on a specified floor at a height position equal to or higher than a sum of a floor level 1FL of a lowermost floor and a height He of one floor. The specified floor is a floor where the host 103 and the control device 102 are to be placed, and the specified floor may also be described by being referred to as the floor where the hoist 103 and the control device 102 are to be placed or simply as the placement floor. Note that FIG. 2 illustrates an example in which the host 103 and the control device 102 are placed on a second floor, and the specified floor (placement floor) is the second floor.

When work such as inspection or repair of the hoist 103 and the control device 102 is to be performed, the car top (upper surface) 104*a* of the elevator car 104 is positioned to a floor level 2FL of the second floor corresponding to the specified floor, and a worker performs work on the car top 104*a* of the elevator car 104. In other words, in the present embodiment, the car top 104*a* of the elevator car 104 serves as a stage for the worker. Accordingly, the worker rides on the car top 104*a* from a boarding floor.

When the worker rides on the car top 104*a* from the boarding floor, the car top 104*a* of the elevator car 104 is positioned to coincide with a floor level of the boarding floor. For example, when the boarding floor is a first floor, the car top 104*a* of the elevator car 104 is positioned to the floor level 1FL of the first floor. In this case, the car top 104*a* need not coincide with the floor level 1FL of the boarding floor, and may appropriately be positioned within a range ΔH in which the worker can ride.

When the positioning of the car top (upper surface) 104*a* of the elevator car 104 to the floor level 2FL of the second floor corresponding to the specified floor is ended, the elevator car 104 is fixed with the elevator car fixing device 1 (see FIG. 3) described later. Note that, during work on the car top 104*a*, a hand rail 104*b* is placed on the car top 104*a*. The hand rail 104*b* is contained in a folded state on the car top 104*a* and unfolded over the car top 104*a* during the work.

Figure 3:
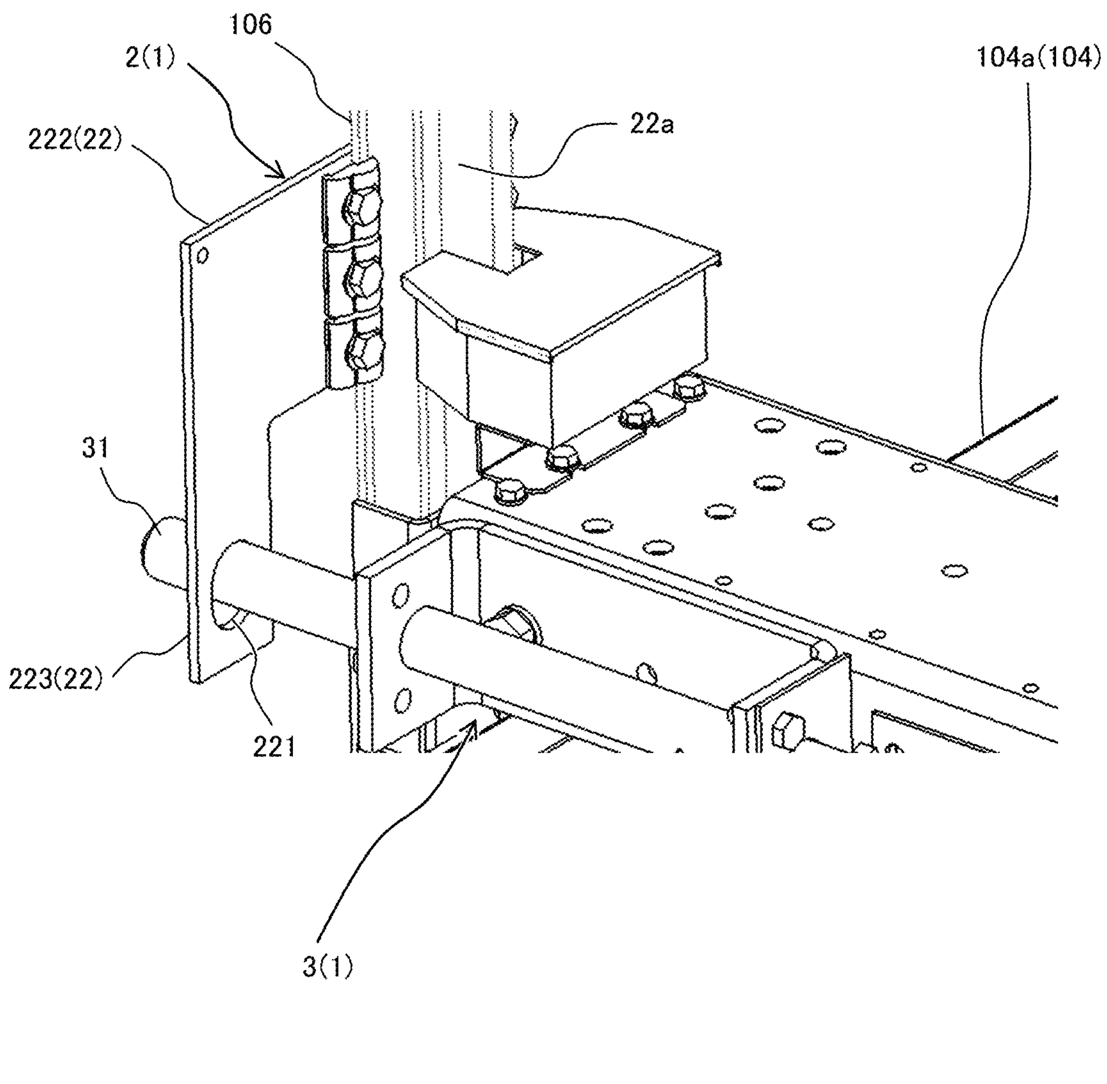
FIG. 3 is a perspective view illustrating a schematic configuration of an elevator car fixing device according to the embodiment of the present invention.

Referring to FIG. 3, a description will be given of the elevator car fixing device 1. FIG. 3 is a perspective view illustrating a schematic configuration of the elevator car fixing device 1 according to the embodiment of the present invention.

The elevator car fixing device 1 is operated on the car top 104*a* by the worker who has ridden on the car top 104*a*, to fix the elevator car 104 to the guide rail 106. Accordingly, the elevator car fixing device 1 is provided on the car top 104*a*.

The elevator car fixing device 1 is configured to include: a fixing portion 2 having a fixing member 22 provided with a through hole 221; and a stopper pin operation mechanism portion 3 having a stopper pin 31 to be inserted into the through hole 221.

The fixing portion 2 has the fixing member 22 formed of a plate-like member. The fixing member 22 in FIG. 3 has an alphabetical letter-L shape, and is configured to have a horizontally extending portion 222 extending in the horizontal direction, and a vertically extending portion 223 extending in the vertical direction. Such a shape of the fixing member 22 improves flexibility of a location of the stopper pin operation mechanism portion 3 having the stopper pin 31 and increases design flexibility of the elevator car 104 and the elevator car fixing device 1.

One horizontal end portion of the horizontally extending portion 222 forms a fixed/supported portion 22*a* to be fixed to and supported by the car guide rail 106. As will be described with reference to FIG. 7 and FIG. 8, the fixed/supported portion 22*a* is fixed to the car guide rail 106 by using rotation restraining members 21A and 21B and fasteners 24 and 25. Therefore, the rotation restraining members 21A and 21B, rail clips 23, and the fasteners 24 and 25 can be regarded as components which constitute the fixing portion 2 together with the fixing member 22.

The vertically extending portion 223 is provided to extend downward from another horizontal end portion of the horizontally extending portion 222. The vertically extending portion 223 is provided with the through hole 221. The through holes 221 is located below the fixed/supported portion 22*a*.

The through hole 221 of the fixing member 22 forms an insertion hole (stopper pin insertion hole) through which the stopper pin 31 is to be inserted. The stopper pin 31 is an engagement member to be engaged with the fixing member 22 of the fixing portion 2, while the stopper pin insertion hole 221 serves as an engagement portion with which the stopper pin 31 is to be engaged.

Figure 4:
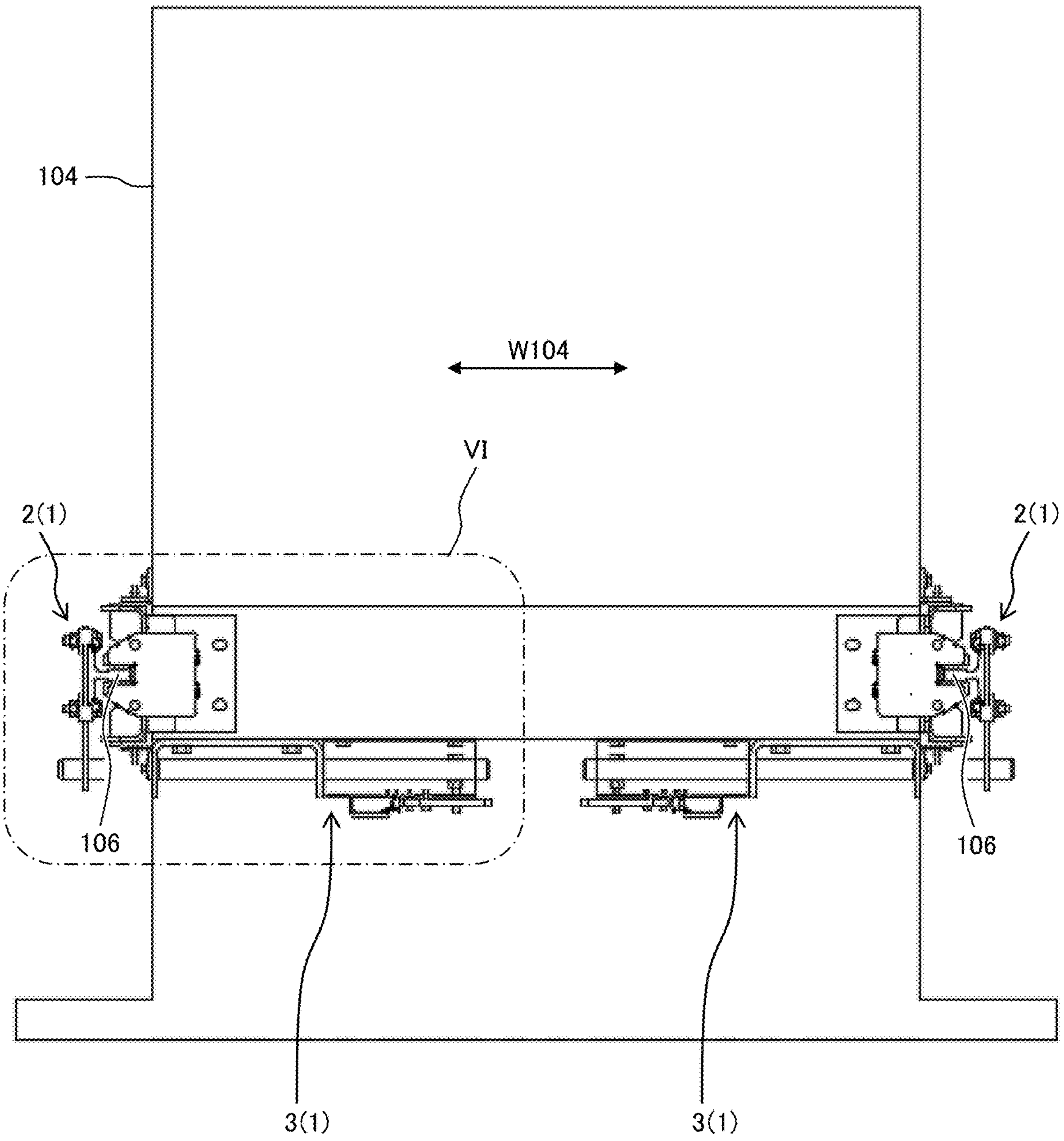
FIG. 4 is a plan view obtained by viewing the elevator car fixing device according to the embodiment of the present invention from above.
Figure 5:
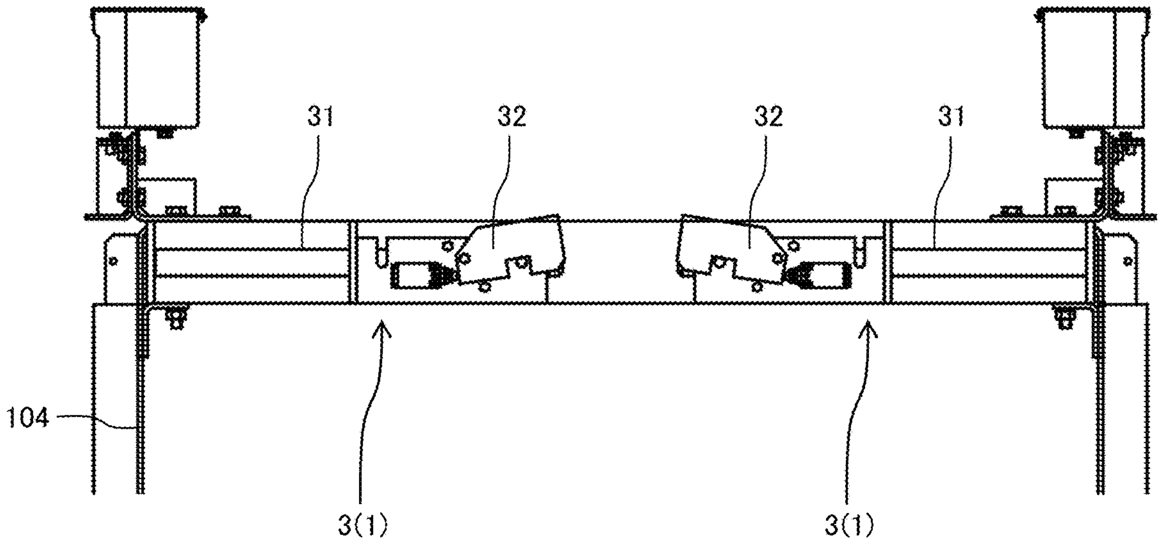
FIG. 5 is a plan view obtained by viewing the elevator car fixing device according to the embodiment of the present invention from the side.
Figure 6:
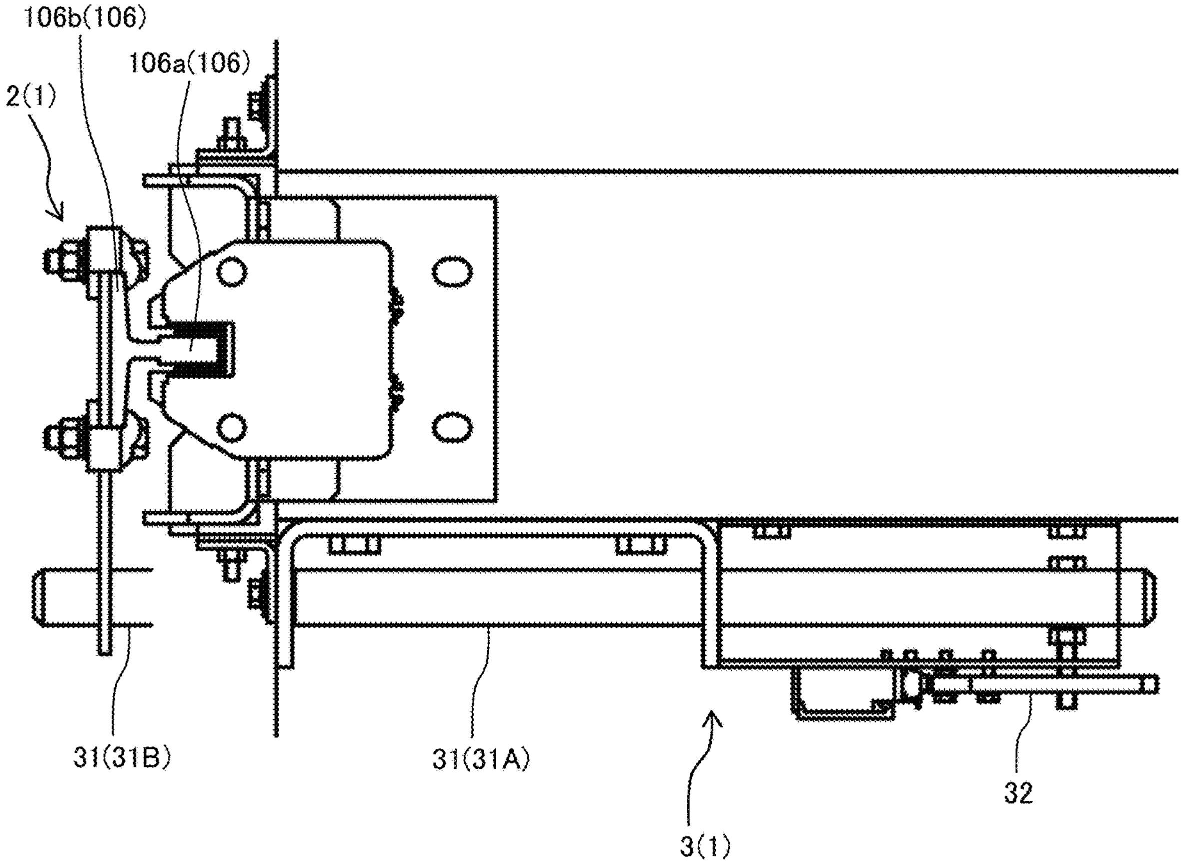
FIG. 6 is an enlarged view enlargedly viewing a VI portion in FIG. 4.

Referring to FIG. 4, FIG. 5, and FIG. 6, a description will be given of the stopper pin operation mechanism portion 3. FIG. 4 is a plan view obtained by viewing the elevator car fixing device 1 according to the embodiment of the present invention from above. FIG. 5 is a plan view obtained by viewing the elevator car fixing device 1 according to the embodiment of the present invention from the side. FIG. 6 is an enlarged view enlargedly illustrating a VI portion in FIG. 4. Note that, in FIG. 5, illustration of the car guide rail 106 and the fixing portion 2 is omitted.

As illustrated in FIG. 4, the one elevator car fixing device 1 is provided in each of both side portions of the elevator car 104 in a width direction W104 thereof.

As illustrated in FIG. 5, the stopper pin operation mechanism portion 3 has the stopper pin 31 and a stopper pin operation mechanism 32 that operates the stopper pin 31. The stopper pin 31 is assembled to the stopper pin operation mechanism portion 3 to be capable of forward and backward movement in a longitudinal direction thereof, and the stopper pin operation mechanism 32 operates the forward and backward movement of the stopper pin 31 in the longitudinal direction.

As illustrated in FIG. 6, the stopper pin 3 is at a retracted position during normal operation of the elevator device 100, and is pushed out from the retracted position during work such as inspection or repair of the hoist 103 and the control device 102 to be inserted through the stopper pin insertion hole 221 (see FIG. 3). Here, 31A denotes the stopper pin 31 at the retracted position, while 31B denotes the stopper pin 31 that has moved forward from the retracted position.

As a result of the insertion of the stopper pin 31 through the stopper pin insertion hole 221 and the engagement of the stopper pin 31 with the fixing member 22 of the fixing portion 2, a load of the elevator car 104 is supported by the car guide rail 106 via the elevator car fixing device 1, and a position of the elevator car 104 is fixed with respect to the car guide rail 106.

Note that, as illustrated in FIG. 6, the car guide rail 106 has a guide portion 106*a* that guides the elevator car 104 and a guide rail fixing portion 106*b* that is fixed to the hoistway wall 101*a* (see FIG. 1) side. The guide rail fixing portion 106*b* has a flat plate shape, and the guide portion 106*a* is erectly provided at a center portion thereof in the width direction. A surface (surface opposed to the elevator car 104) of the guide rail fixing portion 106*b* on a side provided with the guide portion 106*a* of the guide rail fixing portion 106*b* is referred to as a front surface 106*c*, while a surface thereof opposed to the hoistway wall 101*a* is referred to as a back surface 106*d*.

Figure 7:
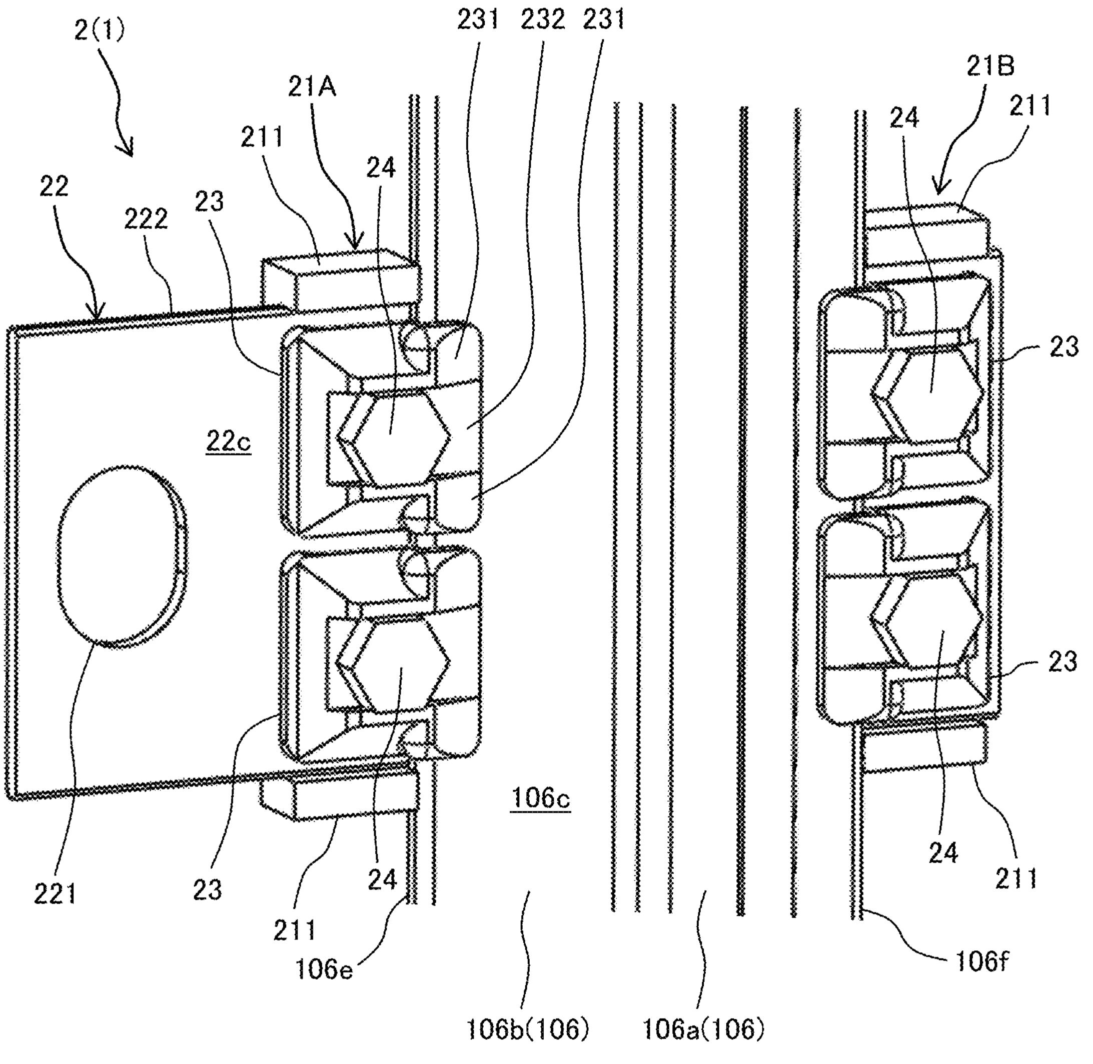
FIG. 7 is a perspective view obtained by viewing a fixing structure of a fixing portion in the elevator car fixing device according to the embodiment of the present invention from an elevator car side.
Figure 8:
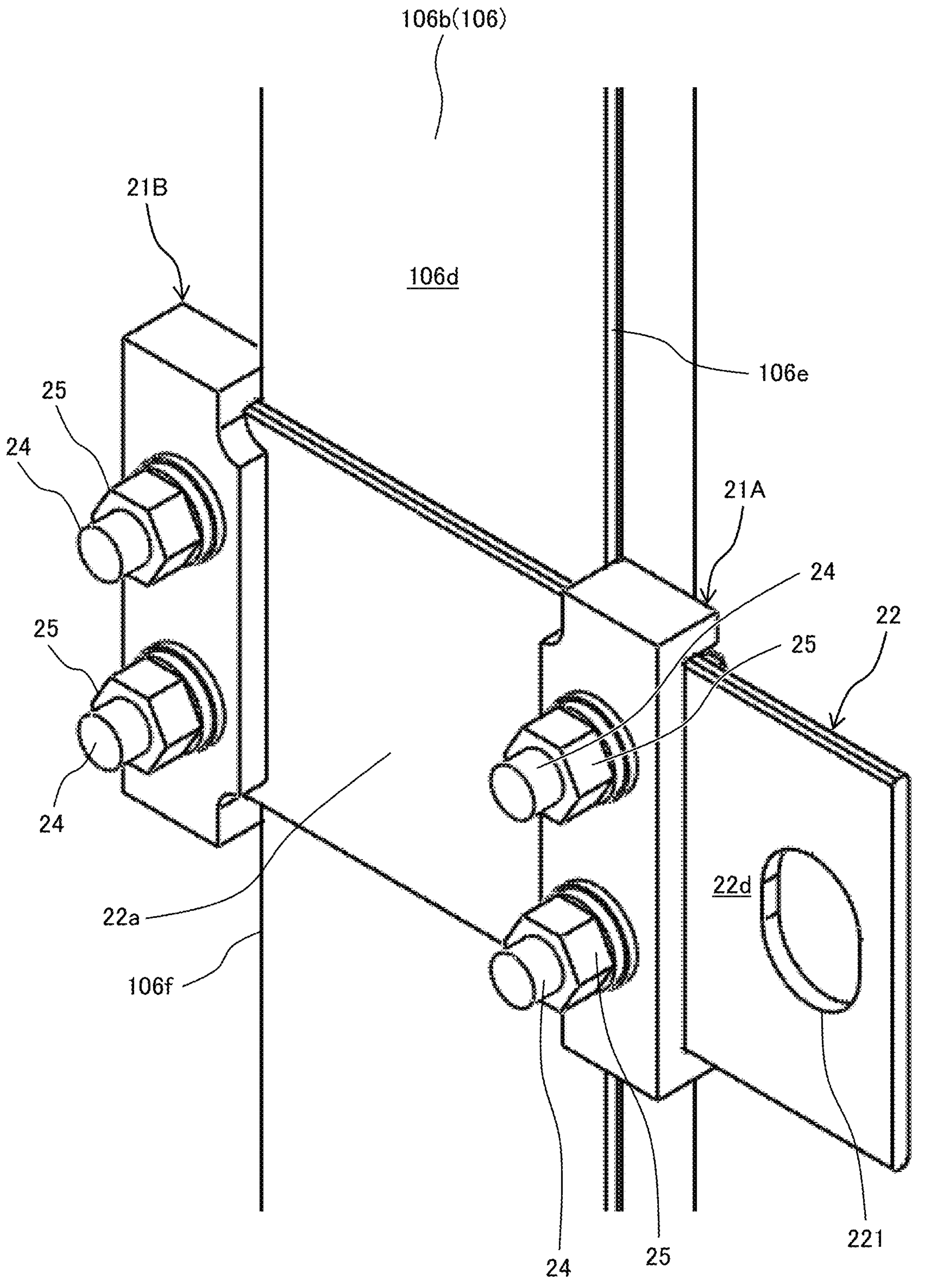
FIG. 8 is a perspective view obtained by viewing the fixing structure of the fixing portion in the elevator car fixing device according to the embodiment of the present invention from a hoistway wall side.
Figure 9:
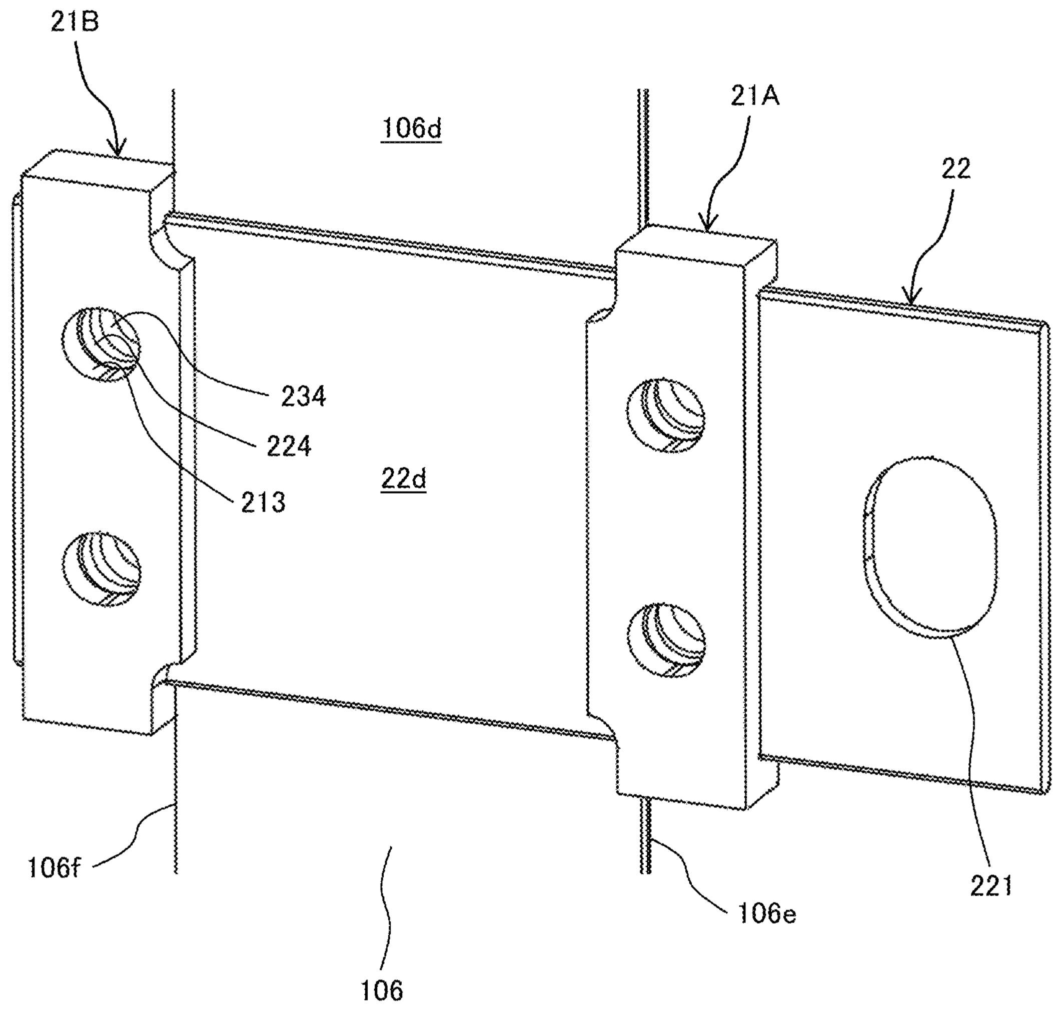
FIG. 9 is a perspective view obtained by viewing the fixing structure of the fixing portion in the elevator car fixing device according to the embodiment of the present invention from the hoistway wall side, which illustrates a state before bolts are fastened.

Referring to FIG. 7, FIG. 8, and FIG. 9, a description will be given of a fixing structure of the fixing portion 2 with respect to the car guide rail 106. FIG. 7 is a perspective view obtained by viewing the fixing structure of the fixing portion 2 in the elevator car fixing device 1 according to the embodiment of the present invention from the elevator car 104 side. FIG. 8 is a perspective view obtained by viewing the fixing structure of the fixing portion 2 in the elevator car fixing device 1 according to the embodiment of the present invention from the hoistway wall 101*a* side. FIG. 9 is a perspective view obtained by viewing the fixing structure of the fixing portion 2 in the elevator car fixing device 1 according to the embodiment of the present invention from the hoistway wall 101*a* side, which illustrates a state before the elevator car fixing device 1 is fastened with bolts.

As described above, the rotation restraining members 21A and 21B, the rail clips 23, and the fasteners 24 and 25 form the fixing portion 2 together with the fixing member 22. A surface 22*c* of the fixing member 22 having the flat plate shape which is opposed to the elevator car 104 is referred to as a front surface, while a surface thereof (surface opposite to the front surface 22*c*) which is opposed to the hoistway wall 101*a* is referred to as a back surface 22*d*.

The fixing member 22 in FIG. 7, FIG. 8, and FIG. 9 has a shape viewed in a direction perpendicular to the front surface 22*c* or the back surface 22*d*, which is a rectangular shape unlike the shape of the fixing member 22 in FIG. 3. In particular, in FIG. 7, FIG. 8, and FIG. 9, the fixing member 22 is configured to have a rectangular shape having a longitudinal direction along a width direction of the car guide rail 106. From another viewpoint, the shape of the fixing member 22 in FIG. 7, FIG. 8, and FIG. 9 is the same as that when the fixing member 22 is not provided with the vertically extending portion 223 in FIG. 3, and is formed only of the horizontally extending portion 222. In the present example, it is possible to bring the stopper pin insertion hole 221 closer to the fixed/supported portion 22*a* (see FIG. 8) of the fixing member 22 and reduce the rotation moment acting on the fixing member 22.

The shape of the fixing member 22 is not limited to the shape in FIG. 3 or to the shapes in FIG. 7, FIG. 8, and FIG. 9, and the fixing member 22 may also have another shape.

As illustrated in FIG. 8 and FIG. 9, the fixing member 22 is fixed to the guide rail fixing portion 106*b* of the car guide rail 106 in such a manner that the front surface 22*c* thereof is opposed to the back surface 106*d* of the guide rail fixing portion 106*b*. In the present embodiment, the fixing member 22 is assembled to the car guide rail 106 in such a manner that the front surface 22*c* of the fixing member 22 is in direct contact with the back surface 106*d* of the guide rail fixing portion 106*b*.

On the back surface 22*d* side of the fixing member 22, the rotation restraining members 21A and 21B are arranged.

As illustrated n FIG. 9, in each of the rail clips 23, the fixing member 22, and the rotation restraining members 21A and 21B, insertion holes 234, 224, and 213 for inserting bolts 24 are formed.

In the present embodiment, the two rail clips 23, the two fasteners 24, and the two fasteners 25 are arranged on a side surface 106*e* side of the guide rail fixing portion 106*b*, while the two rail clips 23, the two fasteners 24, and the two fasteners 25 are arranged on a side surface 106*f* side thereof. In other words, the two rail clips 23, the two fasteners 24 and the two fasteners 25 are arranged on each of both sides of guide rail fixing portion 106*b*.

Figure 10:
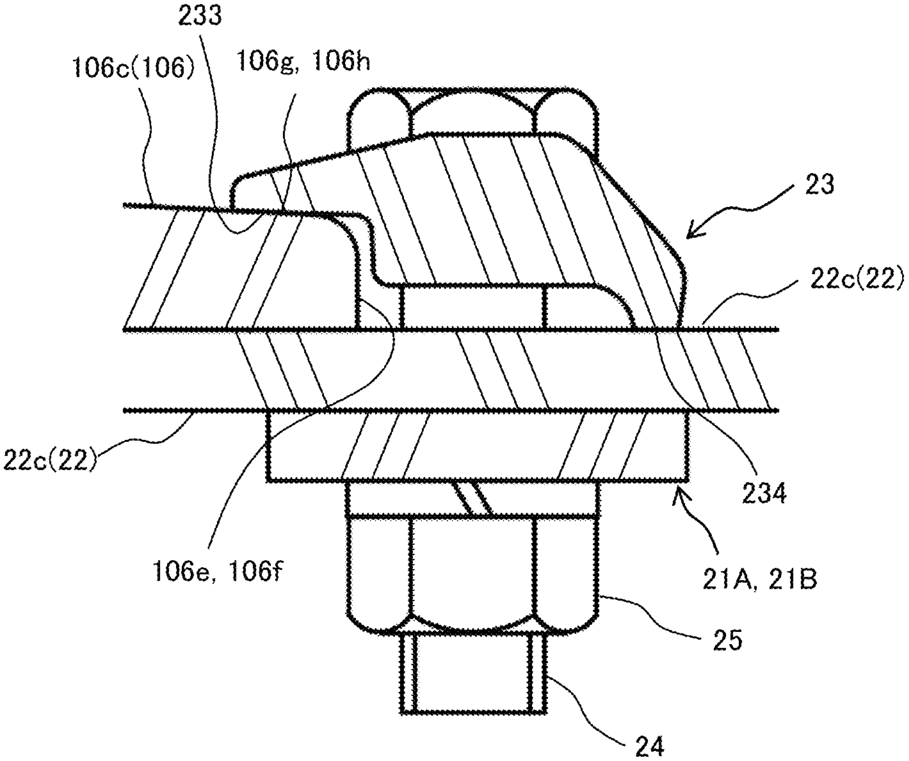
FIG. 10 is a cross-sectional view illustrating a fastening structure of the elevator car fixing device according to the embodiment of the present invention.

Referring to FIG. 10, a description will be given of a fastening structure of the fixing member 22 using the rail clips 23 and the rotation restraining members 21A and 21B. FIG. 10 is a cross-sectional view illustrating the fastening structure of the elevator car fixing device 1 according to the embodiment of the present invention.

As illustrated in FIG. 10, on the front surface 22*c* side of the fixing member 22, the rail clips 23 are arranged. The rail clips 23, the rotation restraining members 21A and 21B, and the fixing member 22 are fastened together by the bolts 24 and nuts 25 (see FIG. 8) such that the rail clips 23 and the rotation restraining members 21A and 21B hold the fixing member 22 therebetween, while the rail clips 23 and the fixing member 22 hold the car guide rail 106 therebetween. With such a configuration, the fixing portion 2 is fixed to the car guide rail 106.

The rail clips 23 form a holding member (first holding member) that holds the fixing member 22 from the front surface 22*c* side (car guide rail 106 side). The rotation restraining members 21A and 21B form a holding member (second holding member) that holds the fixing member 22 from the back surface 22*d* side (side opposite to the car guide rail 106 side).

In other words, the elevator device 100 in the present embodiment includes the fasteners 24 and 25 that extend through the first holding member 23, the fixing member 22, and the second holding members 21A and 21B to fasten the first holding member 23, the fixing member 22, and the second holding members 21A and 21B together.

The first holding member 23, the fixing member 22, and the second holding members 21A and 21B are configured to be fastened together by the fasteners 24 and 25 such that the first holding member 23 and the fixing member 22 hold the car guide rail 106 therebetween, while the first holding member 23 and the second holding members 21A and 21B hold the fixing member 22 therebetween.

The car guide rail 106 has the guide portion 106*a* that guides the elevator car 104, and the guide rail fixing portion 106*b* fixed to the hoistway wall 101*a* side. The first holding member 23 is configured so as to hold width-direction side end portions 106*g* and 106*h* (in the vicinities of the side surfaces 106*e* and 106*f*) of the guide rail fixing portion 106*b* between the fixing member 22 and the first holding member 23. As a result, it is possible to use the rail clips 23 that fix the car guide rail 106 to the hoistway wall 101*a* side, and standardize components.

In the fastening structure of the fixing member 22 using the rail clips 23 and the rotation restraining members 21A and 21B, the bolts 24 and the nuts 25 are fastened together in a state where the fixing member 22 is held between the rail clips 23 and the rotation restraining members 21A and 21B, while the guide rail fixing portion 106*b* of the car guide rail 106 is held between the rail clips 23 and the fixing member 22.

At a contact portion between each of the rail clips 23 and the guide rail fixing portion 106*b*, a contact surface 233 of the rail clip 23 comes into contact with the front surface 106*c* of the guide rail fixing portion 106. Meanwhile, at a contact portion between each of the rail clips 23 and the fixing member 22, a contact surface 234 of the rail clip 23 comes into contact with the front surface 22*c* of the fixing member 22. In this case, an area of the contact surface 234 at which the rail clips 23 are in contact with the front surface 22*c* of the fixing member 22 is small, and it is difficult for the rail clips 23 to obtain a large frictional fixing force against the fixing member 22.

As will also be understood from FIG. 7, the stopper pin insertion hole 221 of the fixing member 22 through which the stopper pin 31 is to be inserted is in a state supported in a cantilever shape with respect to the fixed/supported portion 22*a* of the fixing member 22 (the same applies also to the fixing member 22 in FIG. 3). Consequently, when the stopper pin 31 is inserted through the stopper pin insertion hole 221 of the fixing member 22 and the fixing member 22 receives the load of the elevator car 104, the rotation moment acts on the fixing member 22.

If the rotation restraining members 21A and 21B are not used, the frictional fixing force of the rail clips 23 against the fixing member 22 cannot withstand the rotation moment, and slippage may occur between the rail clips 23 and the fixing member 22. When the slippage occurs between the rail clips 23 and the fixing member 22, due to the rotation moment, the fixing member 22 rotates in a direction in which one horizontal end portion thereof, which is provided with the stopper pin insertion hole 221, is raised relative to another horizontal end portion thereof.

Even when the rotation restraining members 21A and 21B are not used, the fixing member 22 receives the rotation moment and rotates to bring the bolts 24 into contact with the side surfaces 106*e* and 106*f* of the car guide rail 106, which restrains further rotation of the fixing member 22.

However, the elevator car fixing device 1 in which the slippage has occurred between the rail clips 23 and the fixing member 22 has lost reliability as the fixing device, and using the elevator car fixing device 1 as it is presents a problem. Alternatively, when contact between the stopper pin 31 and the stopper pin insertion holes 221 in the width direction (horizontal direction) of the car guide rail 106 occurs before the rotation of the fixing member 22 is restrained by contact between the bolts 24 and the side surfaces 106*e* and 106*f* of the car guide rail 106, and additionally, a contact pressure between the stopper pin 31 and the stopper pin insertion hole 221 increases, the stopper pin 31 may not be able to be pulled out of the stopper pin insertion hole 221. In other words, the fixation of the elevator car 104 by the fixing portion 2 may not be able to be cancelled.

In the present embodiment, the rotation restraining members 21A and 21B are used to restrain rotation of the fixing member 22 due to the rotation moment.

Figure 11:
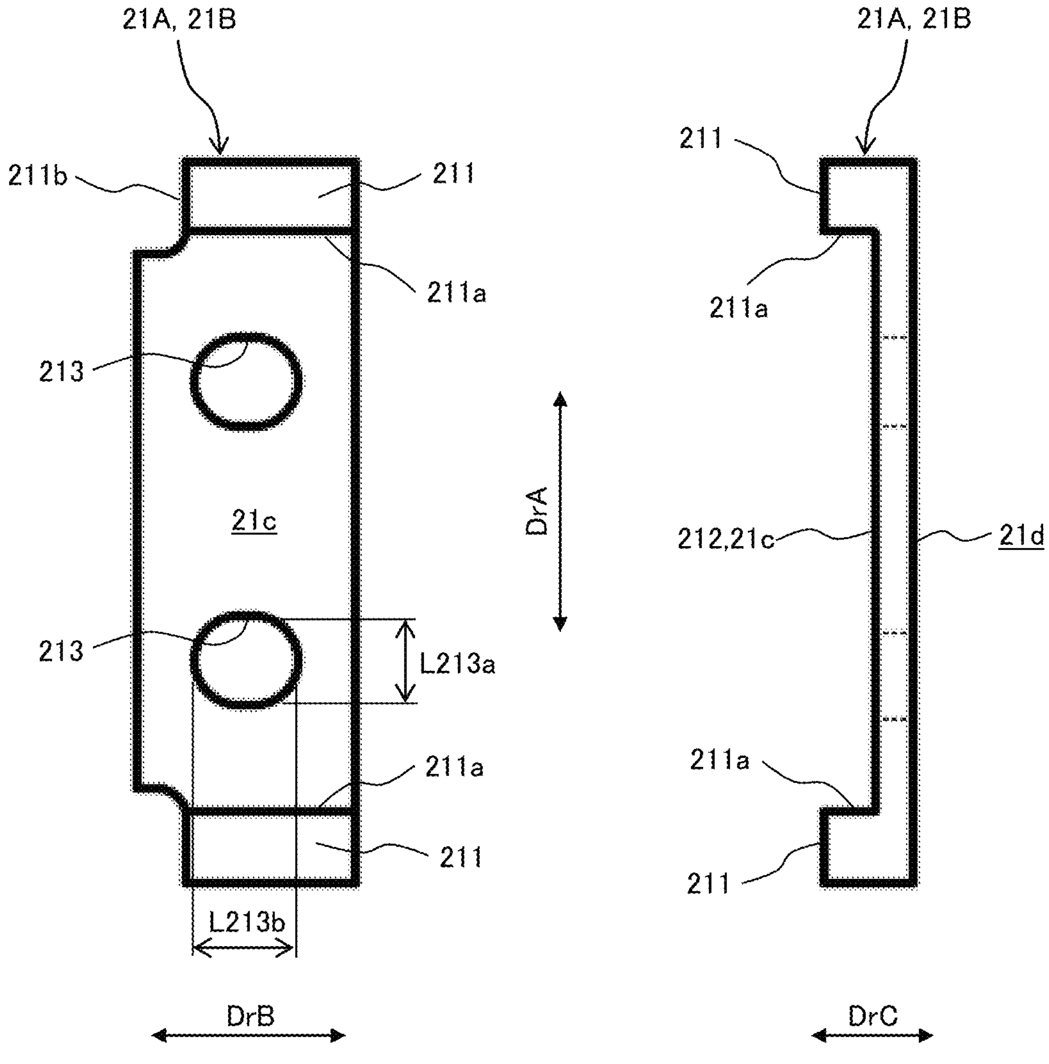
FIG. 11 is a plan view of a rotation restraining member according to the embodiment of the present invention.
Figure 12:
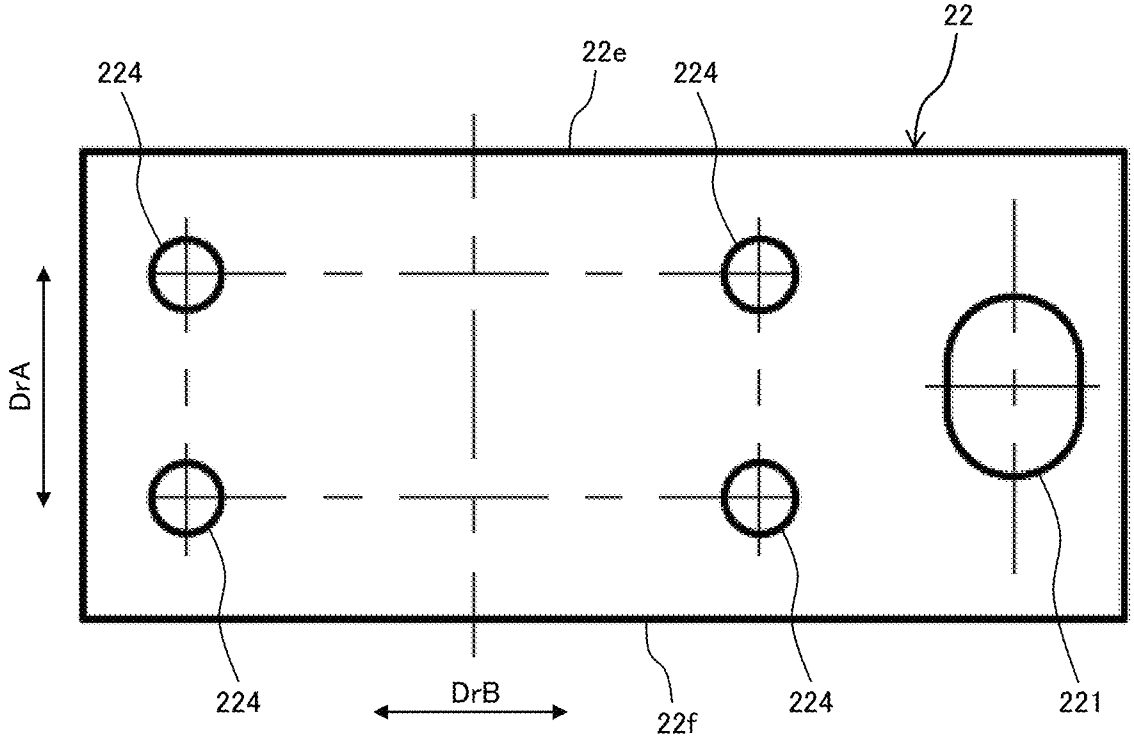
FIG. 12 is a plan view of a fixing member according to the embodiment of the present invention.

Referring to FIG. 11 and FIG. 12 in conjunction with FIG. 7, a description will be given of the rotation restraining members 21A and 21B and the fixing member 22. FIG. 11 is a plan view of each the rotation restraining members according to the embodiment of the present invention. FIG. 12 is a plan view of the fixing member 22 according to the embodiment of the present invention.

A left view in FIG. 11 is a front view of each of the rotation restraining members 21A and 21B, while a right view therein is a side view of each of the rotation restraining members 21A and 21B. Also, in FIG. 11, DrA represents a vertical direction (height direction) of each of the rotation restraining members 21A and 21B, DrB represents a width direction of each of the rotation restraining members 21A and 21B, and DrC represents a thickness direction of each of the rotation restraining members 21A and 21B. The width direction DrB coincides with the width direction of the car guide rail 106.

As illustrated in FIG. 11, each of the rotation restraining members 21A and 21B has a surface 21*c* facing the elevator car 104 side and opposed to the fixing member 22 as a front surface, while each of the rotation restraining members 21A and 21B has a surface opposed to the hoistway wall 101*a* as a back surface 21*d*. The front surface 21*c* of each of the rotation restraining members 21A and 21B is provided with a convex-shaped portion 211.

The convex-shaped portion 211 is erectly provided on the front surface 21*c* of the fixing member 22 so as to protrude from the back surface 22*d* side of the fixing member 22 toward the front surface 22*c* side thereof. The convex-shaped portion 211 has a side surface 211*a* rising perpendicularly to the front surface 21*c*. The convex-shaped portion 211 is provided at each of both end portions of each of the rotation restraining members 21A and 21B in the vertical direction.

When viewed from the convex-shaped portion 211, the fixing member 22 is formed with a groove-shaped portion. The groove-shaped portion has the front surface 21*c* of the fixing member 22 as a bottom surface thereof, while having a side surface 211*a* of the convex-shaped portion 211 as the side surface thereof. In this case, the side surface 211*a* of the convex-shaped portion 211 provided at an upper end portion of the fixing member 22 and a side surface 211*a* of the convex-shaped portion 211 provided at a lower end portion thereof are opposed to each other in the vertical direction DrA.

As illustrated in FIG. 7 and FIG. 12, in a state where the rotation restraining members 21A and 21B and the fixing member 22 are assembled to each other, the side surface 211*a* of the convex-shaped portion 211 provided at an upper end portion of each of the rotation restraining members 21A and 21B and an upper side surface 22*e* of the fixing member 22 are opposed to each other, while the side surface 211*a* of the convex-shaped portion 211 provided at a lower end portion of each of the rotation restraining members 21A and 21B and a lower side surface 22*f* of the fixing member 22 are opposed to each other.

Each of the convex-shaped portion 211 and the side surface 211*a* thereof, which are opposed to the upper side surface 22*e* or the lower side surface 22*f* of the fixing member 22, functions as a restraining portion (rotation restraining portion) that restrains the rotation of the fixing member 22 when the rotation moment described later acts on the fixing member 22.

The convex-shaped portions 211 of the rotation restraining members 21A and 21B have side surfaces 211*b* opposed to the side surfaces 106*e* and 106*f* of the guide rail fixing portion 106*b*, which are formed at one end portions in the width direction DrB thereof. In a state where the fixing portion 2 is assembled to the car guide rail 106 as in FIG. 7, the side surfaces 211*b* abut on the side surfaces 106*e* and 106*f* of the guide rail fixing portion 106*b* of the car guide rail 106.

The convex-shaped portions 211 and the side surfaces 211*b* thereof form abutting portions that abut on the side surfaces 106*e* and 106*f* of the guide rail fixing portion 106*b*.

As described above, in the elevator device 100 according to the present embodiment including, on the car top 104*a* of the elevator car 104, the elevator car fixing device 1 that fixes the elevator car 104 to the car guide rail 106, the elevator car fixing device 1 is configured to include: the fixing portion 2 having the fixing member 22 provided with the through hole 221, the first holding members (rail clips) 23 that hold the fixing member 22 from the car guide rail 106 side, and the second holding members (rotation restraining members) 21A and 21B that hold the fixing member 22 from a side opposite to the first holding member 23 side; and the stopper pin operation mechanism portion 3 having the stopper pin 31 to be inserted into the through hole 221. The second holding members 21A and 21B have the abutting portions 211 that abut on the side surfaces 106*e* and 106*f* of the car guide rail 106.

In this case, the abutting portions 211 of the second holding members 21A and 21B may be configured appropriately to abut on the side surfaces 106*e* and 106*f* of the guide rail fixing portion 106*b* of the car guide rail 106. Since the side surfaces 106*e* and 106*f* of the guide rail fixing portion 106*b* are in the vicinities of the abutting portions 211, it is possible to provide the abutting portions 211 without increasing sizes of the rotation restraining members 21A and 21B.

By causing the side surfaces 211*b* of the convex-shaped portions 211 to abut on the side surfaces 106*e* and 106*f* of the guide rail fixing portion 106*b*, all or part of the rotation moment acting on the fixing member 22 is received by the rotation restraining members 21A and 21B. As a result, the rotation restraining members 21A and 21B restrain the rotation of the fixing member 22. By restraining the rotation of the fixing member 22, the rotation restraining members 21A and 21B can suppress slippage occurring between the rail clips 23 and the fixing member 22, and the fixing member 22 can be fixed securely to the car guide rail 106. This improves the reliability of the elevator car fixing device 1 serving as the fixing device.

To cause the side surfaces 211*b* of the convex-shaped portions 211 to abut on the side surfaces 106*e* and 106*f* of the guide rail fixing portion 106*b*, it is necessary to adjust positions of the rotation restraining members 21A and 21B with respect to the guide rail fixing portion 106*b* on the fixing member 22.

Back to FIG. 11, a description will be given of the rotation restraining members 21A and 21B. The rotation restraining members 21A and 21B are provided with the bolt insertion holes 213 through which the bolts 24 are to be inserted. Each of the bolt insertion holes 213 is formed such that a length dimension L213*b* thereof in the width direction DrB is larger than a length dimension L213*a* in the vertical direction DrA. Thus, it is possible to adjust the positions of the rotation restraining members 21A and 21B with respect to the guide rail fixing portion 106*b* on the fixing member 22 and allow the side surfaces 211*b* of the convex-shaped portions 211 to abut on the side surfaces 106*e* and 106*f* of the guide rail fixing portion 106*b*.

Note that, in the present embodiment, the two bolt insertion holes 213 are provided along the vertical direction DrA. The number of the bolt insertion holes 213 is not limited to 2, and the bolt insertion holes 213 may be provided appropriately according to the number of the fastened bolts 24. For example, in the case of FIG. 3, the number of the bolt insertion holes 213 in each of the rotation restraining members 21A and 21B is 3.

Meanwhile, as illustrated in FIG. 12, the bolt insertion holes 224 provided in the fixing member 22 are circular holes. In addition, in the same manner as in each of the rotation restraining members 21A and 21B, the two bolt insertion holes 224 are provided along the vertical direction DrA. Furthermore, in the fixing member 22, the two bolt insertion holes 224 are provided along the width direction DrB, and accordingly the total of four bolt insertion holes 224 are provided.

The number of the bolt insertion holes 224 in a direction along the width direction DrB corresponds to the rotation restraining members 21A and 21B. The number of the bolt insertion holes 224 in a direction along the vertical direction DrA is not limited to 2, and the bolt insertion holes 224 may be provided appropriately according to the number of the fastened bolts 24. For example, in the case of FIG. 3, the number of the bolt insertion holes 224 in the fixing member 22 is 3.

The present invention is not limited to the above-described embodiments, and further includes various modifications. For example, the above-described embodiments have been described in detail in order to facilitate the understanding of the present invention, and the present invention is not necessarily limited to those including all of the described configurations. In addition, part of the configuration of each of the embodiments can be replaced with other configurations. In addition, part of the configuration of each of the embodiments can be subjected to addition, deletion, and replacement with respect to other configurations.

LIST OF REFERENCE SIGNS

1 Elevator car fixing device
3 Stopper pin operation mechanism portion
21A, 21B Second holding member (rotation restraining member)
22 Fixing member
23 First holding member (rail clip)
24, 25 Fastener (bolt 24 and nut 25)
31 Stopper pin
100 Elevator device
104 Elevator car
104*a* Car top of elevator car 104
106 Car guide rail
106*a* Guide portion of car guide rail 106
106*b* Guide rail fixing portion
106*e*, 106*f* Side surface of car guide rail 106
106*g*, 106*h* Width-direction side end portion of guide rail fixing portion 106*b*
211 Abutting portion of second holding member 21A, 21B that abuts on side surface 106*e*, 106*f* of guide rail fixing portion 106*b*
221 Through hole provided in fixing member 22
222 Horizontally extending portion
223 Vertically extending portion

The invention claimed is:

1. An elevator device comprising, on a car top of an elevator car, an elevator car fixing device that fixes the elevator car to a car guide rail, wherein the elevator car fixing device is configured to include:

a fixing portion, the fixing portion having a fixing member provided with a through hole, a first holding member that holds the fixing member from the car guide rail side, and a second holding member that holds the fixing member from a side opposite to the first holding member;

a stopper pin operation mechanism portion having a stopper pin to be inserted into the through hole, wherein the second holding member has an abutting portion that abuts on a side surface of the car guide rail; and a fastener that extends through the first holding member, the fixing member and the second holding member to fasten the first holding member, the fixing member, and the second holding member together, wherein the first holding member, the fixing member, and the second holding member are fastened together by the fastener such that the first holding member and the fixing member hold the car guide rail therebetween and the first holding member and the second holding member hold the fixing member therebetween.

2. The elevator device according to claim 1, wherein the car guide rail has: a guide portion that guides the elevator car; and a guide rail fixing portion fixed to a hoistway wall side, and wherein the first holding member is configured to hold a width-direction side end portion of the guide rail fixing portion between the fixing member and the first holding member.

3. The elevator device according to claim 2, wherein the abutting portion of the second holding member is configured to abut on a side surface of the guide rail fixing portion of the car guide rail.

4. The elevator device according to claim 3, wherein the fastener includes a bolt and a nut, wherein the second holding member is formed with a bolt insertion hole through which the bolt is to be inserted, and wherein the bolt insertion hole of the second holding member is formed such that a length dimension thereof in a width direction of the car guide rail is larger than a length dimension thereof in a vertical direction.

5. The elevator device according to claim 4, wherein the fixing member is configured to have a rectangular shape having a longitudinal direction along the width direction of the car guide rail.

6. The elevator device according to claim 4, wherein the fixing member is configured to have an alphabetical letter-L shape and have a horizontally extending portion that extends in a horizontal direction and a vertically extending portion that extends in the vertical direction.

* * * * *